(12) United States Patent
Weakley et al.

(10) Patent No.: US 9,147,145 B2
(45) Date of Patent: Sep. 29, 2015

(54) RFID TAG SYSTEM

(71) Applicant: United Technologies Corporation, Hartford, CT (US)

(72) Inventors: Thomas Craig Weakley, Simpsonville, SC (US); Andrew F. Geib, Glastonbury, CT (US); Kevin Donahue, Cherry Hill, NJ (US); Dale R. Masslon, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 219 days.

(21) Appl. No.: 13/632,584

(22) Filed: Oct. 1, 2012

(65) Prior Publication Data

US 2013/0037617 A1 Feb. 14, 2013

Related U.S. Application Data

(63) Continuation-in-part of application No. 13/149,391, filed on May 31, 2011, now Pat. No. 8,899,488.

(51) Int. Cl.
*G06K 19/06* (2006.01)
*G06K 19/07* (2006.01)

(52) U.S. Cl.
CPC .................. *G06K 19/0723* (2013.01)

(58) Field of Classification Search
CPC .......... H01Q 9/0407; H01Q 3/44; G06F 1/16; G06F 1/181; G06F 1/182; G06F 1/185; G06F 1/187; G06F 1/203; G06F 1/1626; G06F 1/1613; G06F 1/1643; G06F 1/1656; G06F 1/1633; G06F 1/1698; G06F 1/1658; G06F 1/1688; G06F 1/26; H05K 13/00; H05K 1/118; H05K 1/147; G06K 19/07749; G06K 19/07771; G06K 19/07773; G06K 19/0723; G06K 19/07718; G06K 19/07745; G06K 19/07758; G06K 19/07786; G06K 7/10475; G06K 19/04; G06K 2017/009; G06K 7/10316; G06K 19/041; G06K 2017/0045; G06K 19/077; G06K 7/10336; G06K 19/07; G06K 19/07762; G06K 19/07769; G06K 7/10277; G06K 7/10346; G08C 17/02; G08B 13/2437

USPC .......................... 235/492; 343/895; 340/693.5
See application file for complete search history.

(56) References Cited

U.S. PATENT DOCUMENTS

| | | |
|---|---|---|
| 5,995,048 A | 11/1999 | Smithgall et al. |
| 7,102,520 B2 | 9/2006 | Liu et al. |
| 7,224,280 B2 | 5/2007 | Ferguson et al. |
| 7,400,298 B2 | 7/2008 | Fogg et al. |
| 7,605,706 B2 | 10/2009 | Khatri |
| 7,688,206 B2 | 3/2010 | Carrender |
| 7,743,997 B2 | 6/2010 | Copeland et al. |

(Continued)

FOREIGN PATENT DOCUMENTS

| | | |
|---|---|---|
| EP | 1602093 B1 | 12/2005 |
| EP | 1769430 B1 | 4/2007 |

(Continued)

*Primary Examiner* — Thien T Mai
(74) *Attorney, Agent, or Firm* — Kinney & Lange, P.A.

(57) ABSTRACT

An identification system for machinery or equipment, such as an aircraft engine, includes a name plate, a mounting bracket for mounting the name plate, a housing, and an RFID tag positioned within the housing between the name plate and the mounting bracket. The RFID tag includes an integrated circuit and an antenna such as a patch antenna.

17 Claims, 7 Drawing Sheets

(56) References Cited

U.S. PATENT DOCUMENTS

| | | |
|---|---|---|
| 7,916,033 B2 | 3/2011 | Westrick |
| 2003/0179151 A1* | 9/2003 | Senba et al. ............... 343/895 |
| 2005/0001785 A1 | 1/2005 | Ferguson |
| 2005/0035924 A1 | 2/2005 | Liu et al. |
| 2007/0152833 A1 | 7/2007 | Kaplan et al. |
| 2007/0216534 A1 | 9/2007 | Ferguson et al. |
| 2008/0018428 A1* | 1/2008 | Nakamura et al. ........... 340/10.1 |
| 2009/0021379 A1 | 1/2009 | Zhu et al. |
| 2009/0096613 A1 | 4/2009 | Westrick |
| 2009/0096629 A1* | 4/2009 | Sprowl et al. ............. 340/693.5 |
| 2009/0256762 A1 | 10/2009 | Weakley |
| 2010/0065647 A1 | 3/2010 | Ritamaki et al. |
| 2010/0181379 A1 | 7/2010 | Okegawa et al. |
| 2010/0289626 A1 | 11/2010 | Oberle et al. |
| 2010/0314454 A1* | 12/2010 | Youn ............................. 235/492 |
| 2011/0057043 A1 | 3/2011 | Weakley |
| 2012/0126016 A1* | 5/2012 | Yang et al. .................... 235/492 |
| 2013/0334321 A1 | 12/2013 | Kato et al. |

FOREIGN PATENT DOCUMENTS

| | | |
|---|---|---|
| WO | 2006009934 A1 | 1/2006 |
| WO | 2006014231 A2 | 2/2006 |

* cited by examiner

RFID TAG SYSTEM

CROSS-REFERENCE TO RELATED APPLICATION(S)

This application is a continuation-in-part of application Ser. No. 13/149,391 filed May 31, 2011 and entitled RFID TAG SYSTEM, which is assigned to the same assignee as the present application. Application Ser. No. 13/149,391 is hereby incorporated by reference.

BACKGROUND

A radio-frequency identification (RFID) tag generally contains two main components. The first is an antenna that receives and radiates an RF signal. The second component is an integrated circuit that may be mounted to a printed circuit board. The integrated circuit processes a received signal provided by the antenna, and provides a modulated output signal to be radiated by the antenna.

The RFID tag may be an active device (i.e., it includes a battery that powers the tag) or a passive device (i.e., does not include a battery and instead relies upon energy received by the antenna to induce a current that provides a voltage to operate the RFID tag). Notably, passive RFID tags are relatively inexpensive and are used ubiquitously.

SUMMARY

An identification system includes a name plate, a mounting bracket, housing, and an RFID tag. The mounting bracket mounts the name plate, for example to an aircraft engine or other machinery or equipment. The housing is positioned between the mounting bracket and the name plate. The RFID tag is positioned within the housing so that it is located between the name plate and the mounting bracket. The RFID tag includes an integrated circuit and an antenna.

DETAILED DESCRIPTION

Figure 1:
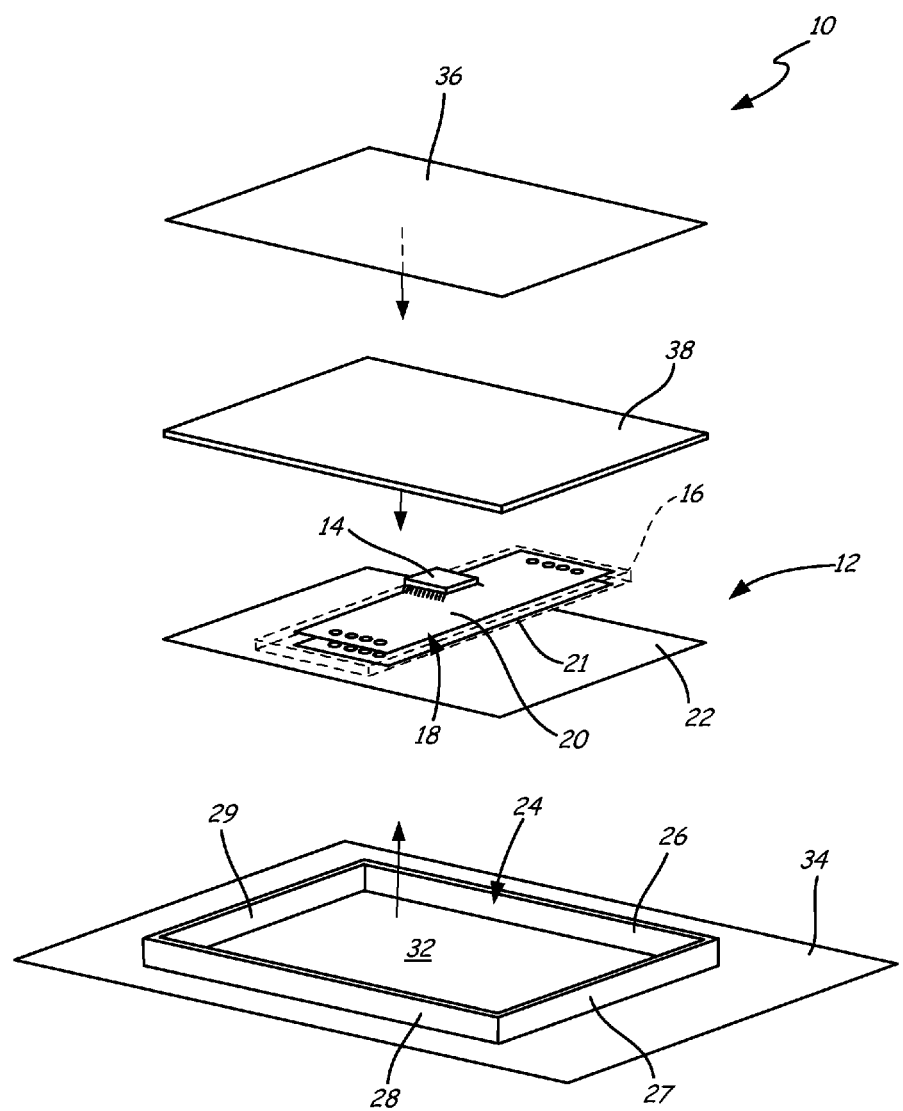
FIG. 1 is a pictorial illustration of a first embodiment of an RFID tag system.

FIG. 1 shows a first embodiment of an RFID tag system. System 10 includes RFID tag 12, which comprises integrated circuit 14 that may be mounted to printed circuit board 16, and antenna 18 mounted on opposing sides of printed circuit board 16. Antenna 18 includes first plate 20 located on a first side on the printed circuit board, and second plate 21 located on an opposite surface of printed circuit board 16 parallel to first plate 20. First and second plates 20, 21 may be coupled by a metallic finger that wraps around one or more peripheral edges of printed circuit board 18. In this embodiment second plate 21 is electrically connected to metallic backplane 22 (e.g., Cu, Al, Au, et cetera).

RFID tag 12 may be placed within housing 24, which includes sidewalls 26-29 that form a recess. Sidewalls 26-29 may be formed from a dielectric material such as for example a ceramic, and housing 24 may include housing base surface 32 that may also be formed from a dielectric. Housing 24 may be mounted to a metallic or non-metallic product surface 34, such as for example a surface of a gas turbine engine or a component part thereof. In one embodiment, the housing may be about 3.5 inches×5 inches, which is a size of a conventional data plate holder used by gas turbine engine manufacturers. Another conventional housing size is 2 inches×1 inch.

RFID tag system 10 also includes metal cover plate/surface 36 that is positioned over and physically separated from RFID tag 12 located within the recess of housing 24. Plate/surface 36 may be secured to the housing via threaded fasteners located in each of the corners of the housing. The fasteners preferably electrically insulate the housing from place/surface 36. For example, the fastener may include a metallic screw with a PFTE washer such as a TEFLON® washer. However, it is contemplated that the fasteners may also be metallic to shunt plate/surface 36 to metallic backplane 22. RFID tag 12 and the metal plate 36 are electromagnetically coupled when exposed to a radiating RF reader, and tuned to operate over a wide frequency range, such as for example about 840 to 960 MHz, 860 to 960 MHz, 900 to 960 MHz, or 860 to 930 MHz. The system may also include dielectric spacer substrate 38 that physically separates integrated circuit 14 and metal cover plate 36. The dielectric spacer substrate may be a foam, a thermal insulator for high temperature operation, air, et cetera.

Figure 2:
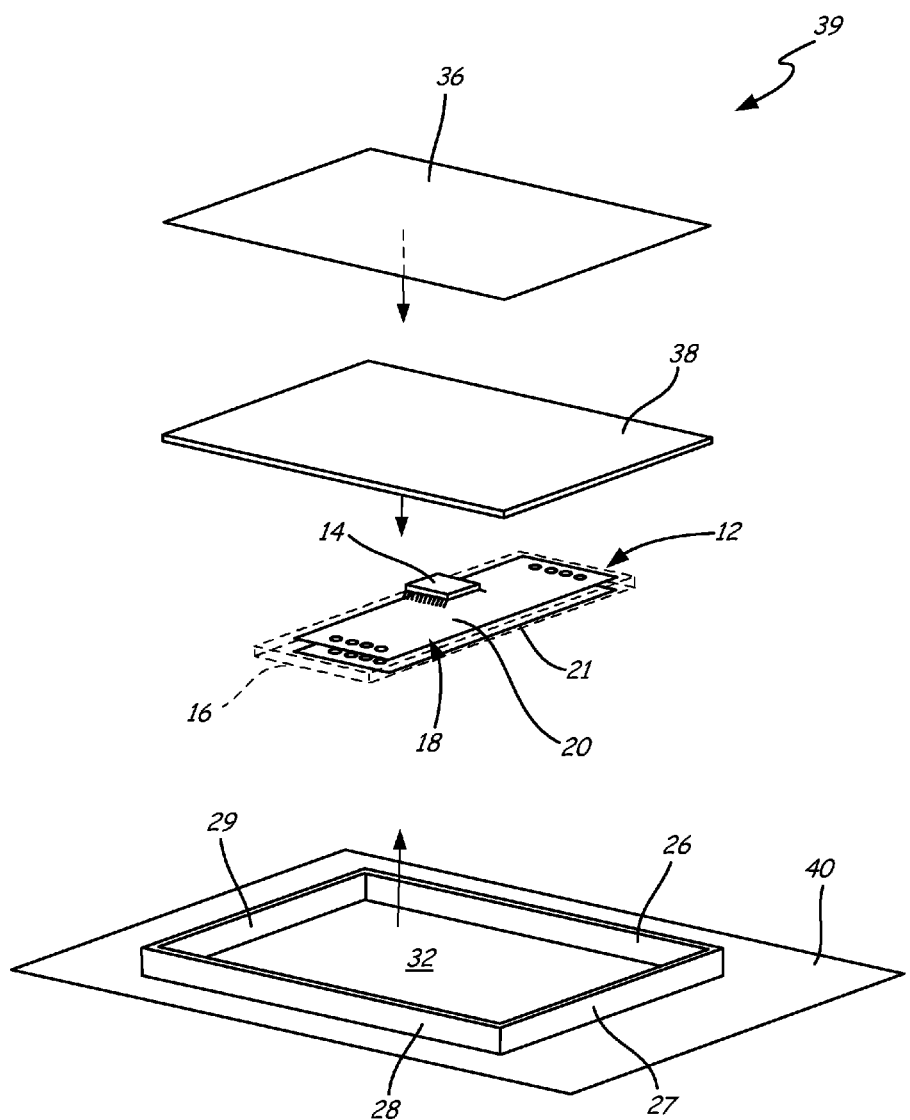
FIG. 2 is a pictorial illustration of a second embodiment of an RFID tag system.

FIG. 2 illustrates a second embodiment of an RFID tag system. System 39 of FIG. 2 is substantially the same as the system illustrated in FIG. 1, with the principal exception that system 39 in FIG. 2 does not include a metal backplane 22 illustrated in FIG. 1. In the embodiment of FIG. 2, housing base surface 32 contacts a metallic surface 40.

Figure 3:
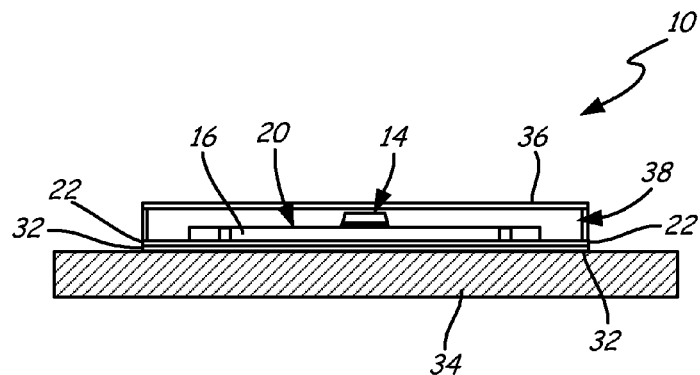
FIG. 3 is a cross-sectional illustration of the RFID tag system of FIG. 1 including a metallic backplane.

FIG. 3 is a cross-sectional illustration of RFID tag system 10 of FIG. 1. In this embodiment, since system 10 includes metallic backplane 22, product mounting surface 34 may be metallic or non-metallic.

Figure 4:
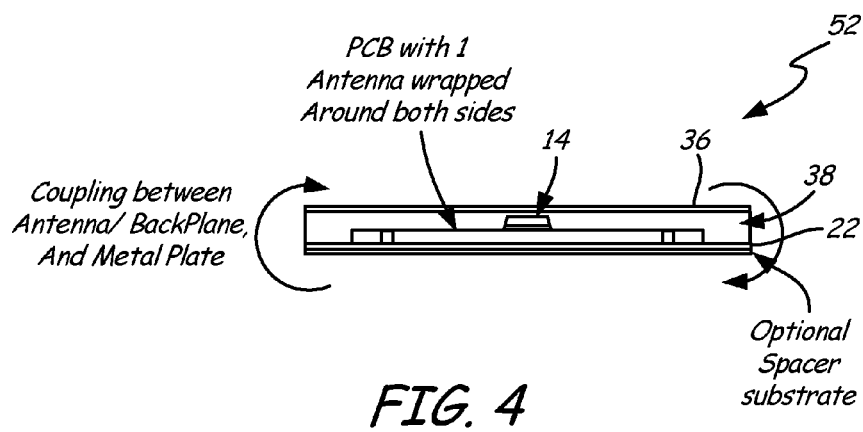
FIG. 4 is a cross-sectional illustration of an RFID tag system of FIG. 1 without the metallic backplane and mounted on a metallic surface.

FIG. 4 is a cross-sectional illustration of RFID tag system 52. This embodiment is substantially the same as the embodiment illustrated in FIG. 3 with the principal exception that RFID tag system 52 does not have to be coupled to a surface, such as mounting surface 34 illustrated in FIG. 3.

Figure 5:
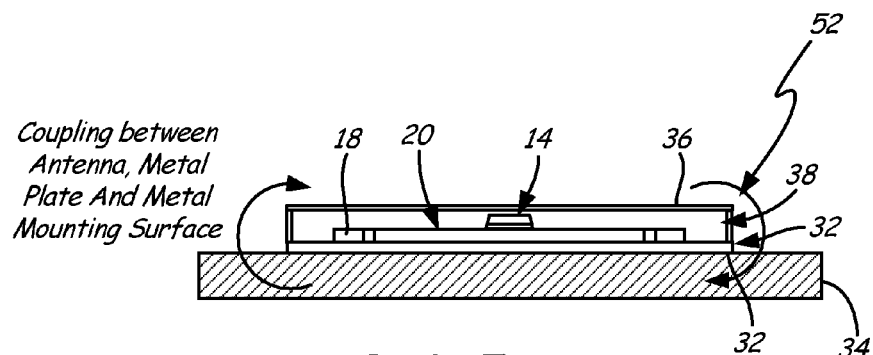
FIG. 5 is a cross-sectional illustration of the RFID tag system illustrated in FIG. 2.

FIG. 5 is a cross-sectional illustration of RFID tag system 39 illustrated in FIG. 2. In this embodiment, base surface 32 of housing 24 connects to mounting surface 40 which is metallic.

Figure 6:
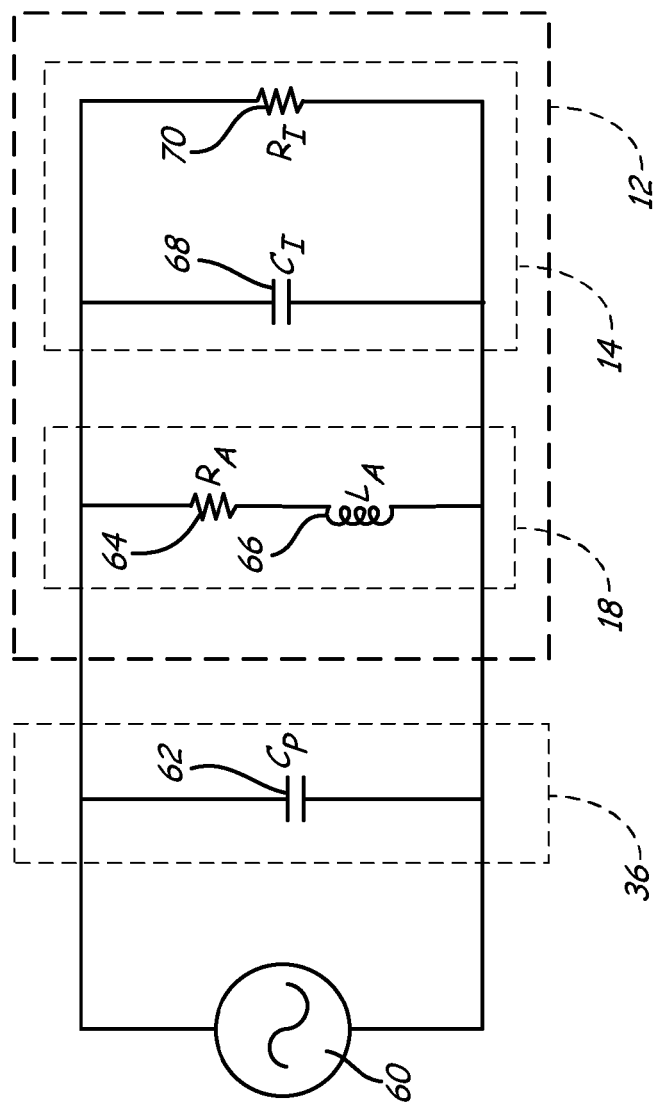
FIG. 6 is a schematic illustration of an equivalent electrical circuit representation of an RFID reader electromagnetically coupled to RFID tag system of FIG. 1.

FIG. 6 is a schematic illustration of an equivalent electrical circuit representation of an RFID reader electromagnetically coupled to the RFID tag system 10. The RFID tag reader radiates an RF signal, which the RFID tag receives and converts to an electrical signal. Thus in this equivalent electrical circuit representation, the RFID reader is electrically represented by a signal source 60. The metal plate 36 is represented by its capacitance value Cp 62. The equivalent electrical circuit representation of RFID tag 12 includes components for antenna 18 and integrated circuit 14, both of which are equivalently illustrated in FIG. 6. Antenna 18 has an impedance that includes serially connected resistance $R_A$ 64 and inductance $L_A$ 66. Integrated circuit 14 is represented by an impedance shown as capacitance $C_I$ 68 and resistance $R_I$ 70, which are shown in electrical series. Metal plate/surface 36 provides the capacitance $C_P$ that may be used to tune the system to operate within the desired wide band frequency range. For example, the metal plate/surface provides a second pole in the RFID tag system response.

In addition to the capacitance $C_P$ provided by metal plate/surface 36 (FIG. 1), the system response may be tuned using by adjusting the shape of the antenna (e.g., placing notch on the top plate 20), adjusting the distance between surfaces, the surface area of metal surfaces that provide a capacitance, et cetera.

Figure 7A:
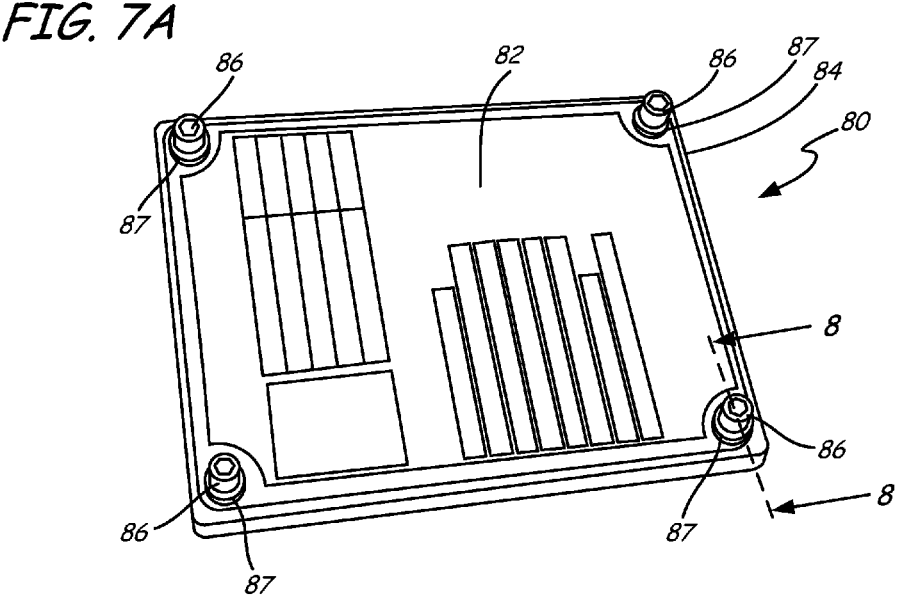
FIG. 7A shows a pictorial illustration of a third embodiment of an RFID tag system.

FIGS. 7A-7D show another embodiment of an RFID tag system, which makes use of a patch antenna. FIG. 7A is a perspective view of RFID system 80, and shows name plate 82, housing 84, socket head screws 86, and insulating shoulder washers 87. Engine name plate 82 is, in this embodiment, a metal plate similar to plate 36 shown in FIGS. 1 and 2. In FIG. 7A, name plate 82 shows the type of engine data that typically will be reported on an aircraft engine name plate, such as engine model, engine assembly part number, serial number, date of manufacturing, etc.

Figure 7B:
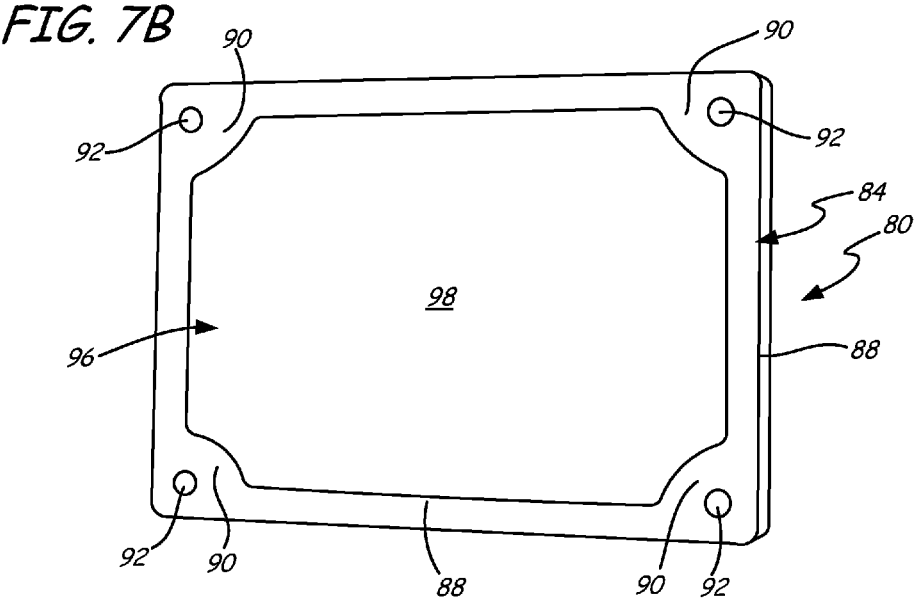
FIG. 7B shows a pictorial illustration of the RFID tag system of FIG. 7A, with the name plate removed.

FIG. 7B shows RFID tag system 80 with name plate 82 and screws 86 removed. As shown in FIG. 7B, housing 84 includes four sidewalls 88 that are joined at corner sections 90. Each corner section 90 contains bore 92, through which one of screws 86 extends. Sidewalls 88, corner sections 90, and closed end (bottom) 94 (shown in FIG. 7C) define hollow cavity 96. When name plate 82 is placed over the open top of housing 84, cavity 96 is closed.

In FIG. 7B, thermal insulator 98 is shown in cavity 96. Thermal insulator 98 is positioned beneath name plate 82 and above RFID tag (shown in FIG. 7C). In this embodiment, thermal insulator 98 is an insulating sheet made of, for example, of Insulfrax paper PS9273, although other thermally insulating sheets, tapes, or foams can be used to reduce heat transfer.

In one embodiment, housing 84 is a ceramic, polymeric, or other dielectric material, such as Victrex PEEK 450G. Housing 84 forms a dielectric or electrically insulating structure around RFID tag 100.

Figure 7C:
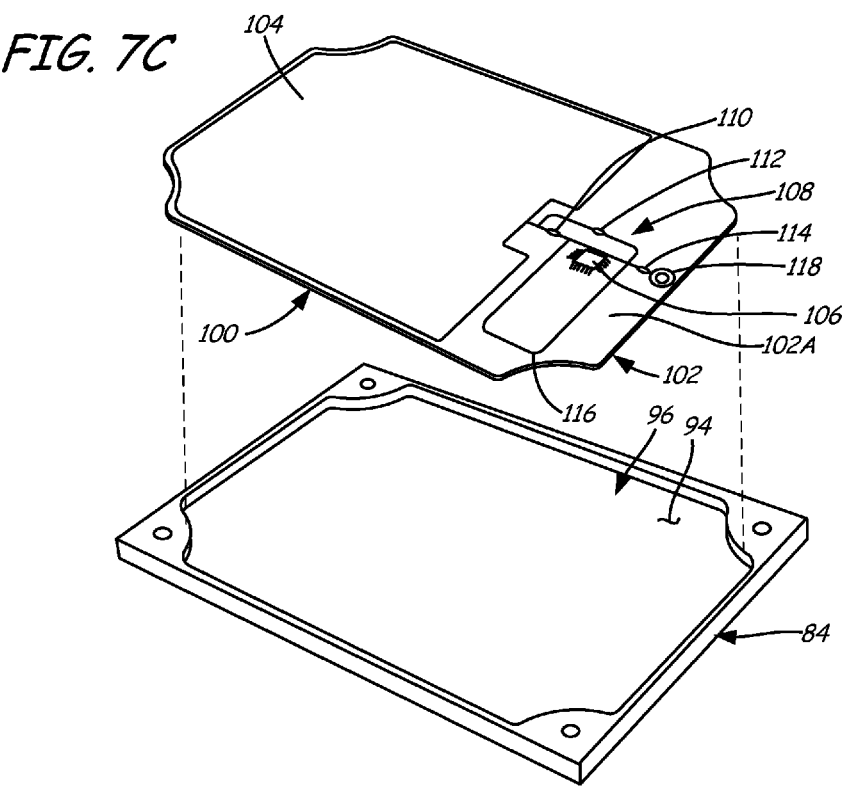
FIG. 7C is an exploded view showing the RFID tag system of FIGS. 7A and 7B, with a layer of thermal insulating material removed and with the RFID tag removed from the housing.

FIG. 7C is an exploded view showing RFID tag 100 separated from housing 84. In this embodiment, when system 80 is assembled, a bottom surface of RFID tag 100 is in direct contact with bottom 94 of housing 84.

Figure 7D:
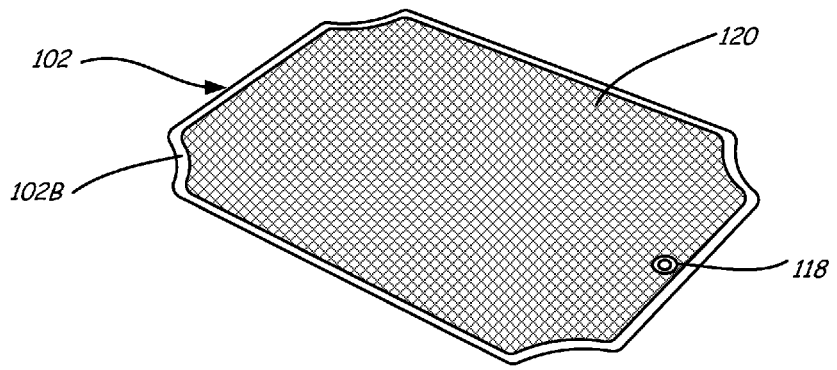
FIG. 7D shows a pictorial view of the bottom side of the RFID tag of FIG. 7C.

RFID tag 100 includes printed circuit board substrate 102, patch antenna 104, matching circuit 108 (made up of capacitors 110, 112, 114, and inductor 116), plated through hole 118, and backside conductive layer 120 (shown in FIG. 7D). Antenna 104, integrated circuit 106, and matching circuit 108 are all located on topside 102A of printed circuit board 102, as shown in FIG. 7C.

As shown in FIG. 7D, backside conductive layer 120 is located on back or bottom side 102B of printed circuit board 102. Plated through hole 118 extends between topside 102A and bottom side 102B of printed circuit board 102, and provides an electrical connection between matching circuit 108 and backside conductor 120.

Printed circuit board 102 is a dielectric material such as a low dielectric polytetrafluoroethylene (PTFE). In one embodiment, printed circuit board 102 is an Arlon DiClad 870 printed circuit board, 0.125 inch thick, with $e_r$=2.33.

Patch antenna 104 is a large electrically conductive layer on the top surface of printed circuit board 102. Patch antenna 104 can take any one of a number of different shapes, including square, rectangular, circular, elliptical or polygonal. Antenna 104 is connected to integrated circuit 106 through matching circuit 108. Antenna 104 is AC coupled to integrated circuit 106 through series capacitor 110. Short circuit prevention capacitor 114 is connected between integrated circuit 106 and plated through hole 118. It provides an AC connection to ground (backside conductor 120) via plated through hole 118. Shunt capacitor 112 is connected between patch antenna 104 and capacitor 114. Inductor 116 is a conductive trace that extends between capacitors 110 and 114. In one embodiment, series capacitor 110 and shunt capacitor 114 each have a capacitance of one pF capacitors, while short circuit prevention capacitor 114 has a capacitance of 22 pF.

Figure 8:
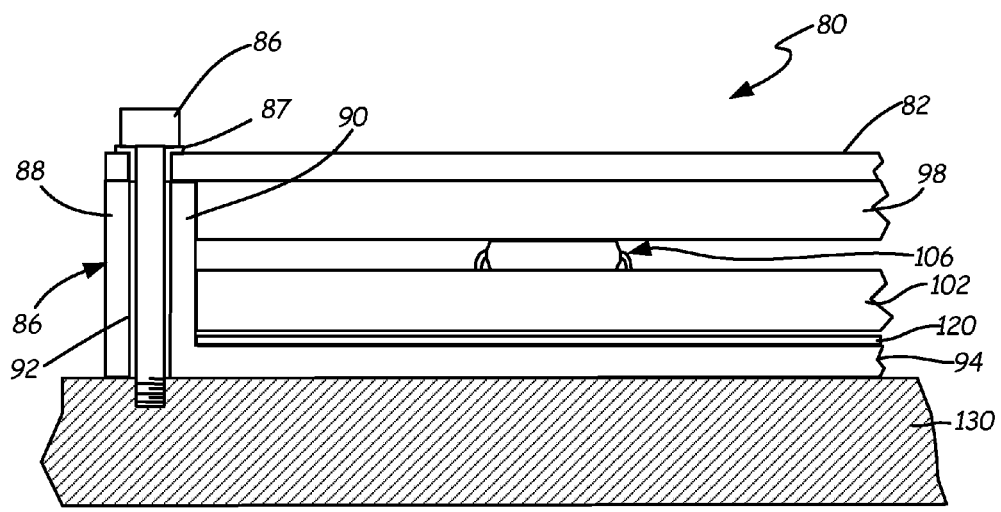
FIG. 8 shows a cross-sectional view of a portion of the RFID tag system along section 8-8 of FIG. 7.

FIG. 8 is a sectional view of RFID tag system 80 along section 8-8 of FIG. 7A. In this cross-sectional view, system 80 is shown mounted to mounting bracket 120, which mounts name plate 82 (along with the rest of RFID tag system 80) to an aircraft engine (not shown).

As shown in FIG. 8, closed end (bottom) 94 of housing 84 is in direct contact with mounting bracket 130. Name plate 82 and housing 86 are attached to mount 130 by screws 86. In order to avoid electrically connecting name plate 82 to mounting bracket 130, PTFE insulating shoulder washers 87 are used to electrically insulate name plate 82 from screws 86. As a result, name plate 82 and mounting bracket 130 do not combine to create a cavity around patch antenna 104 that would prevent RF communication. Together, name plate 82 and patch antenna 104 form a coupled resonator.

Patch antenna 104 shown in the embodiment of FIGS. 7A-8 offers a narrower operating bandwidth than the embodiments illustrated in FIGS. 1-6. On the other hand, it provides higher gain, and thus a longer read range (for example, about 40% longer) than the wider bandwidth antenna shown in FIGS. 1-6. For those engines that will not be operating in all geographic regions, and thus will not require use of a wide bandwidth antenna to cover all possible RFID frequencies that might be used, the patch antenna offers a higher gain/longer read range.

Figure 9:
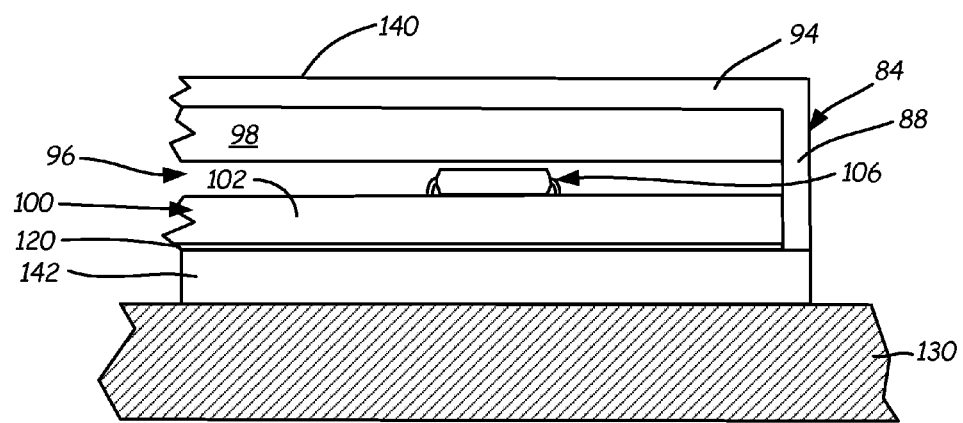
FIG. 9 shows a partial cross-sectional illustration of a fourth embodiment of an RFID tag system.

FIG. 9 illustrates another embodiment utilizing RFID tag 100 with patch antenna 104. In this embodiment, housing 84 is inverted so that closed end 94 forms the top rather than the bottom of housing 84. In this embodiment, the engine data is written or engraved on the closed top surface of housing 84. Thus, in FIG. 9, top surface 140 of closed end 94 of housing 84 acts as the engine name plate, and the need for a metallic name plate is eliminated.

In this embodiment, an electrically conductive base plate, such as aluminum baseplate 142 shown in FIG. 9, can be placed in contact with backside conductor 120 of RFID tag 100. Housing 84 can be placed directly on top of aluminum baseplate 142, which is positioned between housing 84 and mounting bracket 130. Because the name plate is formed on nonconductive surface 140 of housing 88, screws 86 shown in FIGS. 7A and 8 do not have to be electrically isolated as in the embodiment shown in FIG. 8.

DISCUSSION OF POSSIBLE EMBODIMENTS

The following are nonexclusive descriptions of possible embodiments of the present invention.

An identification system to include a name plate, a mounting bracket for mounting the name plate, housing positioned between the mounting bracket and the name plate, and an RFID tag positioned within the housing and between the name plate and the mounting bracket. The RFID tag can include an integrated circuit with an antenna.

The identification system of the preceding paragraph can optionally include, additionally and/or alternatively, any one or more of the following features, configurations and/or additional components:

The housing can be a dielectric structure.

The name plate can be a metal plate and can be electrically insulated from the antenna.

The housing can have an open top, sidewalls, and a bottom.

The name plate can be secured to the open top of the housing to cover and enclose the RFID tag.

The RFID tag can include a circuit board having a first surface and a second surface.

The integrated circuit and the antenna can be attached to the first surface of the circuit board.

The RFID tag can further include an electrically conductive layer on the second surface of the circuit board.

The antenna can comprise a patch antenna.

The RFID tag can include a matching circuit on the first surface of the circuit board that is connected to the patch antenna, the integrated circuit, and the electrically conductive layer that is on the second surface of the circuit board.

The matching circuit can include one or more of a series capacitor, a shunt capacitor, a short circuit prevention capacitor, and an inductor.

The series capacitor can be connected between the patch antenna and the integrated circuit.

The shunt capacitor can be connected between the patch antenna and the electrically conductive layer.

The short circuit prevention capacitor can be connected between the shunt capacitor and the electrically conductive layer.

The inductor can be connected between the series capacitor and the short circuit prevention capacitor.

The short circuit prevention capacitor can be connected to the electrically conductive layer through a plated through hole in the circuit board.

A thermal insulator can be positioned with the housing between the RFID tag and the name plate.

The housing can comprise dielectric structure having a closed top, sidewalls, and an open bottom.

The closed top of the dielectric structure can have information relating to machinery or equipment on its outer surface to form the name plate.

An electrically conductive baseplate can cover the open bottom of the housing, and the electrically conductive baseplate can be electrically connected to the RFID tag.

The antenna and the name plate can form a coupled resonator.

The name plate can include information relating to an aircraft engine or other machinery or equipment.

An identification system can include a dielectric housing having an open top, sidewalls and a bottom, an RFID tag positioned within the housing, and a name plate secured to the open top to cover and enclose the RFID tag. The RFID tag can include an integrated circuit and a patch antenna.

The identification system of the preceding paragraph can optionally include, additionally and/or alternatively, any one or more of the following features, configurations and/or additional components:

The RFID tag can include a circuit board having a first surface and a second surface.

The integrated circuit and the patch antenna can be attached to the first surface of the circuit board.

An electrically conductive layer can be attached to the second surface of the circuit board.

The RFID tag can include a matching circuit on the first surface of the circuit board, and the matching circuit can be connected to the patch antenna, the integrated circuit, and the electrically conductive layer.

A thermal insulator can be positioned within the housing between the RFID tag and the name plate.

The name plate can include information relating to an aircraft engine or other machinery or equipment.

An identification system can include a delectric housing, an RFID tag, and an electrically conductive baseplate. The dielectric housing can have a closed top, sidewalls, and an open bottom, and the closed top can have information on its outer surface to form a name plate. The RFID tag can be positioned within the housing and can include an integrated circuit and a patch antenna. The electrically conductive baseplate can cover the open bottom of the housing and can be electrically connected to the RFID tag.

The identification system of the preceding paragraph can optionally include, additionally and/or alternatively, any one or more of the following features, configurations and/or additional components:

The RFID tag can include a circuit board having a first surface and a second surface.

The integrated circuit and the patch antenna can be attached to the first surface of the circuit board.

An electrically conductive layer can be attached to the second surface of the circuit board.

The RFID tag can include a matching circuit on the first surface of the circuit board, and the matching circuit can be connected to the patch antenna, the integrated circuit, and the electrically conductive layer.

Thermal insulator can be positioned within the housing between the RFID tag and the name plate.

The name plate can include information relating to an aircraft engine or other machinery or equipment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An identification system comprising:
a metal name plate;
a mounting bracket for mounting the name plate;
a housing positioned between the mounting bracket and the name plate; and
an RFID tag positioned within the housing and between the name plate and the mounting bracket, the RFID tag including an integrated circuit and an antenna; and
wherein the metal nameplate is electrically isolated from the mounting bracket, and wherein the metal name plate is spaced apart from the antenna such that the antenna and the metal name plate form an electromagnetically coupled resonator.

2. The identification system of claim 1, wherein the housing is a dielectric structure.

3. The identification system of claim 1, wherein the housing has an open top, sidewalls, and a bottom, and the name plate is secured to the open top to cover and enclose the RFID tag.

4. The identification system of claim 1, wherein the RFID tag further includes a circuit board having a first surface and a second surface, wherein the integrated circuit and the antenna are attached to the first surface, wherein the RFID tag further includes an electrically conductive layer on the second surface of the circuit board.

5. The identification system of claim 4, wherein the antenna comprises a patch antenna.

6. The identification system of claim 5, wherein the RFID tag further comprises a matching circuit on the first surface connected to the patch antenna, the integrated circuit and the electrically conductive layer.

7. The identification system of claim 6, wherein the matching circuit comprises a series capacitor connected between the patch antenna and the integrated circuit, a shunt capacitor connected between the patch antenna and the electrically conductive layer, and a short circuit prevention capacitor connected between the shunt capacitor and the electrically conductive layer; wherein the matching circuit further comprises an inductor connected between the series capacitor and the short circuit prevention capacitor; and wherein the short circuit prevention capacitor is connected to the electrically conductive layer through a plated through hole in the circuit board.

8. The identification system of claim 1 and further comprising a thermal insulator within the housing between the RFID tag and the name plate.

9. The identification system of claim 1, wherein the housing comprises a dielectric structure having a closed top, sidewalls, and an open bottom, and wherein the closed top has information relating to machinery or equipment on its outer surface to form the name plate.

10. The identification system of claim 9 and further comprising an electrically conductive baseplate covering the open bottom of the housing and electrically connected to the RFID tag.

11. An identification system comprising:
a dielectric housing having an open top, sidewalls, and a bottom;
an RFID tag positioned within the housing, the RFID tag including an integrated circuit and a patch antenna; and
a metal name plate secured to the open top to cover and enclose the RFID tag; and
wherein the metal name plate is electrically isolated from a mounting bracket, the mounting bracket for mounting the name plate; and wherein the name plate is spaced apart from the patch antenna such that the patch antenna and the metal name plate form an electromagnetically coupled resonator.

12. The identification system of claim 11, wherein the RFID tag further includes:
a circuit board having a first surface and a second surface, wherein the integrated circuit and the patch antenna are attached to the first surface, and wherein an electrically conductive layer is attached to the second surface; and
a passthrough attached to the circuit board, which electrically connects the electrically conductive layer of the second surface to the integrated circuit and the patch antenna of the first surface.

13. The identification system of claim 12, wherein the RFID tag further comprises a matching circuit on the first surface connected to the patch antenna, the integrated circuit and the electrically conductive layer.

14. The identification system of claim 11 and further comprising a thermal insulator within the housing between the RFID tag and the name plate.

15. An identification system comprising:
a name plate;
a mounting bracket for mounting the name plate;
a housing positioned between the mounting bracket and the name plate; and
an RFID tag positioned within the housing and between the name plate and the mounting bracket, the RFID tag including an integrated circuit and an antenna;
wherein the RFID tag further includes a circuit board having a first surface and a second surface, wherein the integrated circuit and the antenna are attached to the first surface, wherein the RFID tag further includes an electrically conductive layer on the second surface of the circuit board;
wherein the antenna comprises a patch antenna;
wherein the RFID tag further comprises a matching circuit on the first surface connected to the patch antenna, the integrated circuit and the electrically conductive layer; and
wherein the matching circuit comprises a series capacitor connected between the patch antenna and the integrated circuit, a shunt capacitor connected between the patch antenna and the electrically conductive layer, and a short circuit prevention capacitor connected between the shunt capacitor and the electrically conductive layer; wherein the matching circuit further comprises an inductor connected between the series capacitor and the short circuit prevention capacitor; and wherein the short circuit prevention capacitor is connected to the electrically conductive layer through a plated through hole in the circuit board.

16. The identification system of claim 15, wherein the housing is a dielectric structure.

17. The identification system of claim 15, wherein the housing has an open top, sidewalls, and a bottom, and the name plate is secured to the open top to cover and enclose the RFID tag.

* * * * *